United States Patent [19]
Ichihashi

[11] Patent Number: 5,637,801
[45] Date of Patent: Jun. 10, 1997

[54] SEMICONDUCTOR DIAPHRAGM PRESSURE SENSOR WITH GROOVES TO ABSORB ADHESIVE

[75] Inventor: Motomi Ichihashi, Tokyo, Japan

[73] Assignee: Mitsubishi Denki Kabushiki Kaisha, Tokyo, Japan

[21] Appl. No.: 579,672

[22] Filed: Dec. 28, 1995

[30] Foreign Application Priority Data

Sep. 4, 1995 [JP] Japan ................... 7-226372

[51] Int. Cl.⁶ .................. G01L 7/08; G01L 9/00
[52] U.S. Cl. .................. 73/715; 73/717; 73/723; 29/740
[58] Field of Search ............ 73/715–728; 29/840, 29/740; 74/260

[56] References Cited

U.S. PATENT DOCUMENTS 4,787,250  11/1988  Varrese ................... 73/715

FOREIGN PATENT DOCUMENTS 134034   9/1984  Japan.
3-71030  3/1991  Japan ................... G01L 9/04
727639   1/1995  Japan.

Primary Examiner—Richard Chilcot
Assistant Examiner—Joseph L. Felber

[57] ABSTRACT

A semiconductor pressure sensor includes a pressure sensor chip including a diaphragm at the center thereof for measuring pressure and a die with an opening for introducing the pressure to the diaphragm. The pressure sensor chip is fixed to the die using an adhesive agent. Furthermore, prevention grooves are formed on the surface of the pressure sensor chip to prevent the adhesive agent from elevating onto the diaphragm.

13 Claims, 4 Drawing Sheets

SEMICONDUCTOR DIAPHRAGM PRESSURE SENSOR WITH GROOVES TO ABSORB ADHESIVE

BACKGROUND OF THE INVENTION

1. Field of the Invention

The present invention relates to a semiconductor pressure sensor comprising a pressure detecting device which is fixed by using an adhesive resin.

2. Description of the Prior Art

FIG. 9 shows a prior art semiconductor pressure sensor. The figure shows the bottom of a pressure sensor chip 91 which detects a pressure and converts it to an electrical signal. A diaphragm 92 is formed at the center of pressure sensor chip 91 to amplify the stress caused by the pressure for more sensitive detection. Four resistors (not shown) are formed on the front side of diaphragm 92 to make a bridge circuit which converts the stress generated on the diaphragm to an electrical signal. FIG. 10 shows a cross section 10—10 of pressure sensor chip 91 shown in FIG. 9. Pressure sensor chip 91 is attached with an adhesive resin 95 to a die 94 which has an opening for receiving pressures.

Before adhesive resin 95 is thermally set, it decreases in viscosity, elevates at corners 96, and sets along the edges of diaphragm 92. Since this phenomenon is more significant at the corners, it is considered to be caused by capillarity. Elevated adhesive resin 97 causes the electrical characteristics of diaphragm 92 to vary and hence degrades the reliability and the accuracy of the pressure sensor.

The Japanese utility model laid-open publication SHO 59-134034 and Japanese patent laid-open publication HEI 7-27639 disclose methods to resolve the above problem. In these methods bumps and depressions are formed on the portions of the die which correspond to the diaphragm in order to prevent the adhesive resin from being elevated on the diaphragm.

SUMMARY OF THE INVENTION

The object of the present invention is therefore to provide a semiconductor pressure sensor which solves these problems.

The method in which depressions are formed on the die to prevent the adhesive resin from being elevated on the diaphragm has the following drawbacks:

(1) additional processes to form the depressions are required;

(2) the processes to form the depressions require position accuracy because the positions of the diaphragm opening and the depressions on the die must match; and (3) the depressions formed on the die do not necessarily keep the adhesive resin from being elevated because this elevation is caused by capillarity.

Thus, the object of the present invention is to provide for a semiconductor pressure sensor which keeps the adhesive resin from being elevated on the diaphragm and which is easily manufactured.

The semiconductor pressure sensor according to the present invention comprises a pressure sensor chip including a diaphragm at the center thereof for measuring pressure and a die with an opening for guiding the pressures to the diaphragm, the pressure sensor chip being pasted to the die with thermally setting adhesive resin. It also includes prevention grooves formed on the pressure sensor chip's surface to be pasted to the die, around the peripheral of the diaphragm opening, at least each corner thereof, at a given distance from each side of the diaphragm opening in order to prevent. the adhesive resin from being elevated on the diaphragm.

Preferably the prevention grooves of the semiconductor pressure sensor are formed in each of the four corners of the pressure sensor chip, outside the diaphragm, with two grooves extending from each edge of the pressure sensor chip to make an L shape.

Preferably the prevention grooves of the semiconductor pressure sensor are formed with four grooves surrounding the diaphragm, each groove being parallel to each side of the diaphragm and extending from one edge of the pressure sensor chip to the opposite edge thereof.

Preferably the prevention grooves of the semiconductor pressure sensor are formed in each of the four corners of the pressure sensor chip with two grooves extending from the adjacent edges of the pressure sensor chip and intersecting with each other to form a cross outside the diaphragm.

Preferably the prevention grooves of the semiconductor pressure sensor are formed in each of the four corners of the pressure sensor chip in a square shape outside the diaphragm and in contact with the corner thereof.

Preferably the prevention grooves of the semiconductor pressure sensor are formed with four perpendicular grooves surrounding the diaphragm, each groove being parallel to each side of the diaphragm and extending from a point inside the edge of the pressure sensor chip to another point inside the opposite edge thereof.

Preferably the prevention grooves of the semiconductor pressure sensor are formed in each of the four corners of the pressure sensor chip in a cross shape outside the diaphragm and with a given distance frown each corner thereof, each groove ending at a distance from the edge of the pressure sensor chip.

Preferably the prevention grooves of the semiconductor pressure sensor are formed in each of the four corners of the pressure sensor chip in a square shape outside the diaphragm, not in contact with the corner thereof, and at some distance therefrom.

BRIEF DESCRIPTION OF THE DRAWINGS

These and other objects, features and advantages of the present invention will become clear from the following description taken in conjunction with the preferred embodiment with reference to the accompanying drawings throughout which like parts are designated by like reference numerals, and in which.

DETAILED DESCRIPTION OF THE PREFERRED EMBODIMENTS

A detailed description of the semiconductor pressure sensor of the present invention is given below with reference to the attached drawings.

[Embodiment 1]

Figure 1:
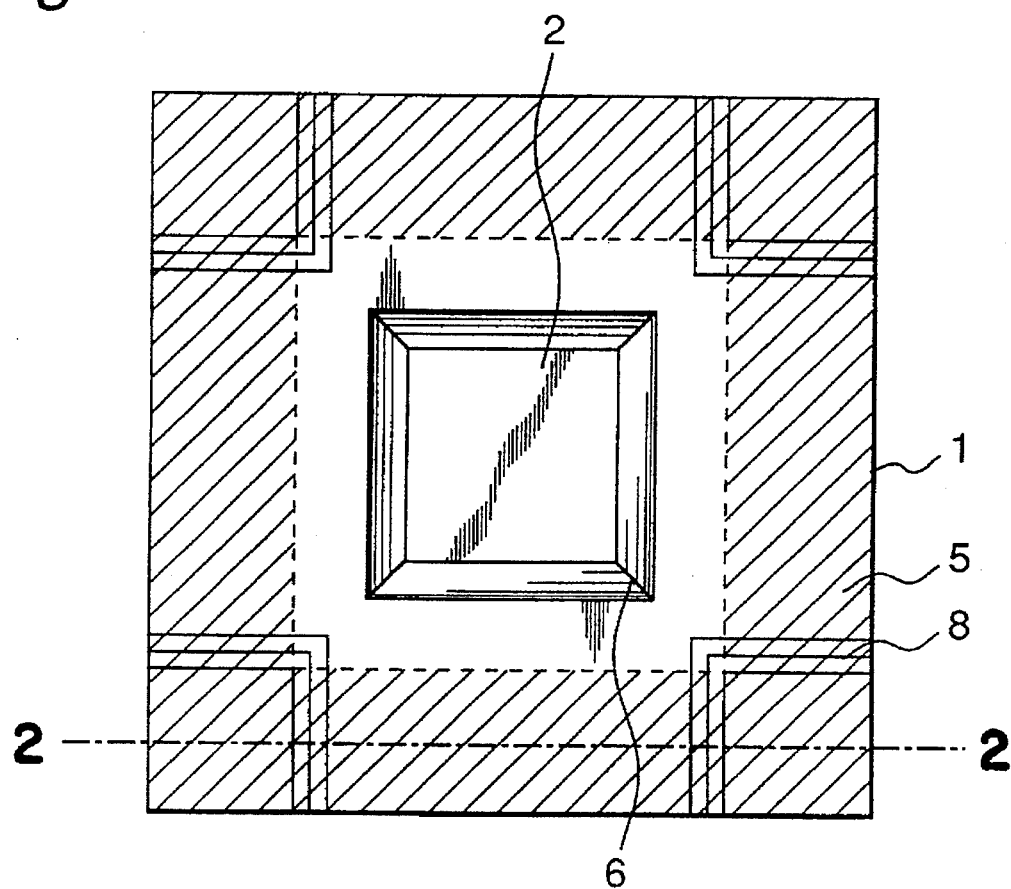
FIG. 1 shows the bottom of Embodiment 1 of the pressure sensor chip used for the semiconductor pressure sensor of the present invention.
Figure 2:
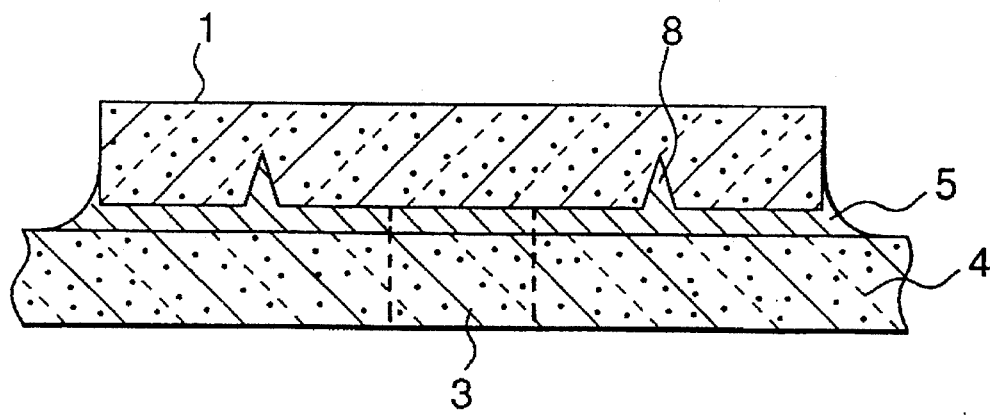
FIG. 2 shows the cross section 2—2 of the semiconductor pressure sensor shown in FIG. 1.

FIG. 1 shows the bottom of Embodiment 1 of the present invention. FIG. 2 exhibits the cross section 2—2 of the semiconductor pressure sensor shown in FIG. 1. The semiconductor pressure sensor of the present invention shown in FIGS. 1 and 2 comprises a die 4 with an opening 3 for receiving pressures and a pressure sensor chip 1 having a diaphragm 2 at its center for measuring pressure and an L-shaped groove 8 at each corner for preventing an adhesive resin 5 from being elevated. Pressure sensor chip 1 is pasted to die 4 with adhesive resin 5 applied to a shaded region of FIGS. 1 and 2.

When pressure sensor chip 1 is pasted to die 4, adhesive resin 5 is sucked in prevention grooves 8 formed on the pressure sensor chip and does not reach diaphragm corners 6.

Prevention grooves 8, for preventing the adhesive resin from reaching the diaphragm, are formed simultaneously with diaphragm 2 in the same anisotropic etching process. Therefore no additional process is required to make the grooves.

[Embodiment 2]

Figure 3:
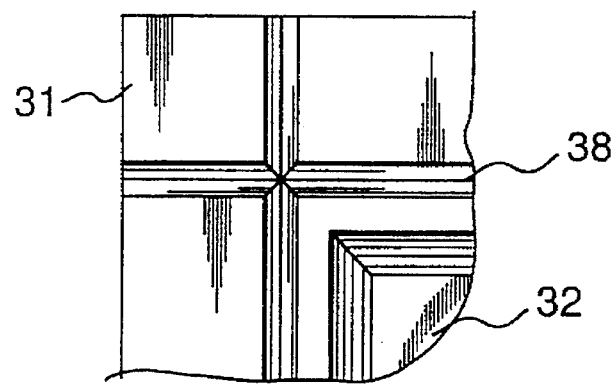
FIG. 3 shows the prevention grooves of Embodiment 2 formed in one of the corners of the bottom of the diaphragm of the pressure sensor chip used for the semiconductor pressure sensor of the present invention.

FIG. 3 shows Embodiment 2 of the semiconductor pressure sensor of the present invention. Prevention grooves 38 in FIG. 3 are formed with four straight grooves to surround diaphragm 32, each groove being parallel to one side of diaphragm 32 with a given distance between them and extending from one edge of pressure sensor chip 31 to the opposite edge thereof.

[Embodiment 3]

Figure 4:
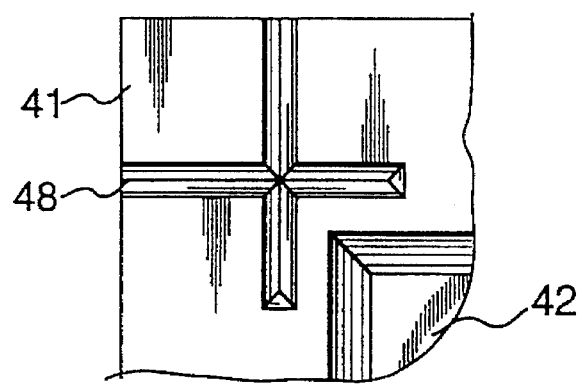
FIG. 4 shows the prevention grooves of Embodiment 3 formed in one of the corners of the bottom of the diaphragm of the pressure sensor chip used for the semiconductor pressure sensor of the present invention.

FIG. 4 shows Embodiment 3 of the semiconductor pressure sensor of the present invention. Prevention grooves 48 are formed in each of the four corners of pressure sensor chip 41 with two grooves which extend from the adjacent edges of pressure sensor chip 41 and intersect with each other to form a cross outside diaphragm 42 as shown in FIG. 4.

[Embodiment 4]

Figure 5:
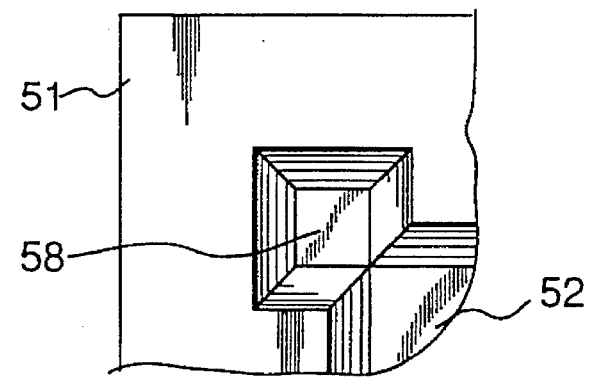
FIG. 5 shows the prevention grooves of Embodiment 4 formed in one of the corners of the bottom of the diaphragm of the pressure sensor chip used for the semiconductor pressure sensor of the present invention.

FIG. 5 shows Embodiment 4 of the semiconductor pressure sensor of the present invention. Prevention grooves; 58 are formed in each corner of the pressure sensor chips 51 in a square shape in contact with the corner of the diaphragm 52 as shown in FIG. 5. These grooves form a "reservoir" of a sufficient capacity to hold the adhesive resin and effectively keep it from being elevated along the corner of the diaphragm.

[Embodiment 5]

Figure 6:
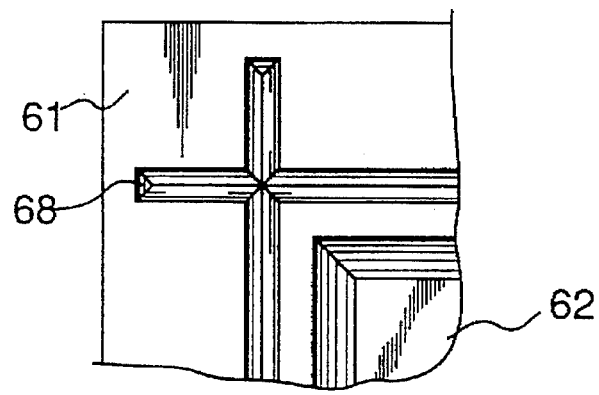
FIG. 6 shows the prevention grooves of Embodiment 5 formed in one of the corners of the bottom of the diaphragm of the pressure sensor chip used for the semiconductor pressure sensor of the present invention.

FIG. 6 shows Embodiment 5 of the semiconductor pressure sensor of the present invention. Prevention grooves 68 are formed with four grooves surrounding diaphragm 62, each groove being parallel to one side of diaphragm 62 with a given distance between them, extending from a point inside the edge of said pressure sensor chip to another point inside the other edge thereof, and making intersections with other grooves in the corners of pressure sensor chip 61 as shown in FIG. 6. This configuration more securely separates the inside of the diaphragm from the outside of the sensor chip than does Embodiment 2 thus providing a better seal for the diaphragm.

Figure 7:
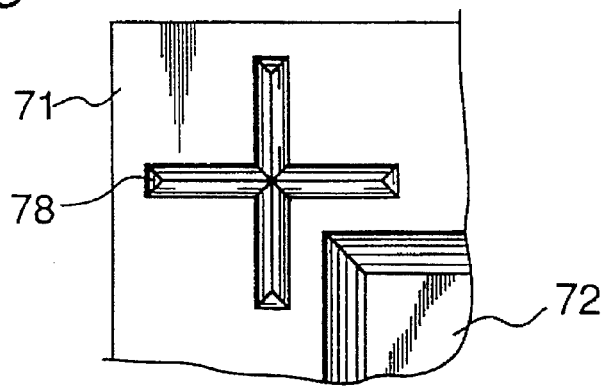
FIG. 7 shows the prevention grooves of Embodiment. 6 formed in one of the corners of the bottom of the diaphragm of the pressure sensor chip used for the semiconductor pressure sensor of the present invention.

FIG. 7 shows Embodiment 6 of the semiconductor pressure sensor of the present invention. Prevention grooves 78 are formed, as shown in FIG. 7, in each of the four corners of pressure sensor chip 71 in a cross shape outside diaphragm 72 at a given distance from the corner of diaphragm 72, each groove ending at a distance from the edge of pressure sensor chip 71. This configuration more securely separates the inside of the diaphragm from the outside of the sensor chip than does Embodiment 3 thus providing a better seal for the diaphragm,

[Embodiment 7]

Figure 8:
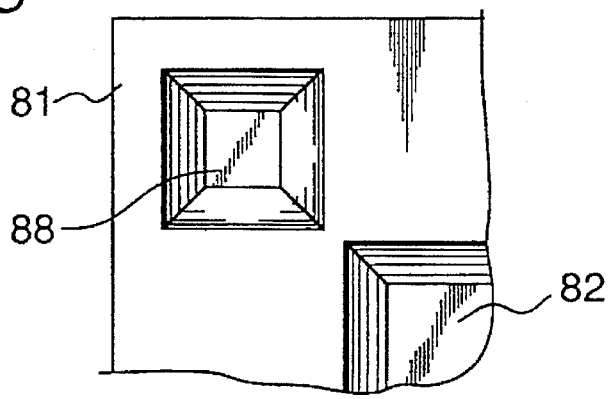
FIG. 8 shows the prevention grooves of Embodiment. 7 formed in one of the corners of the bottom of the diaphragm of the pressure sensor chip used for the semiconductor pressure sensor of the present invention.
Figure 9:
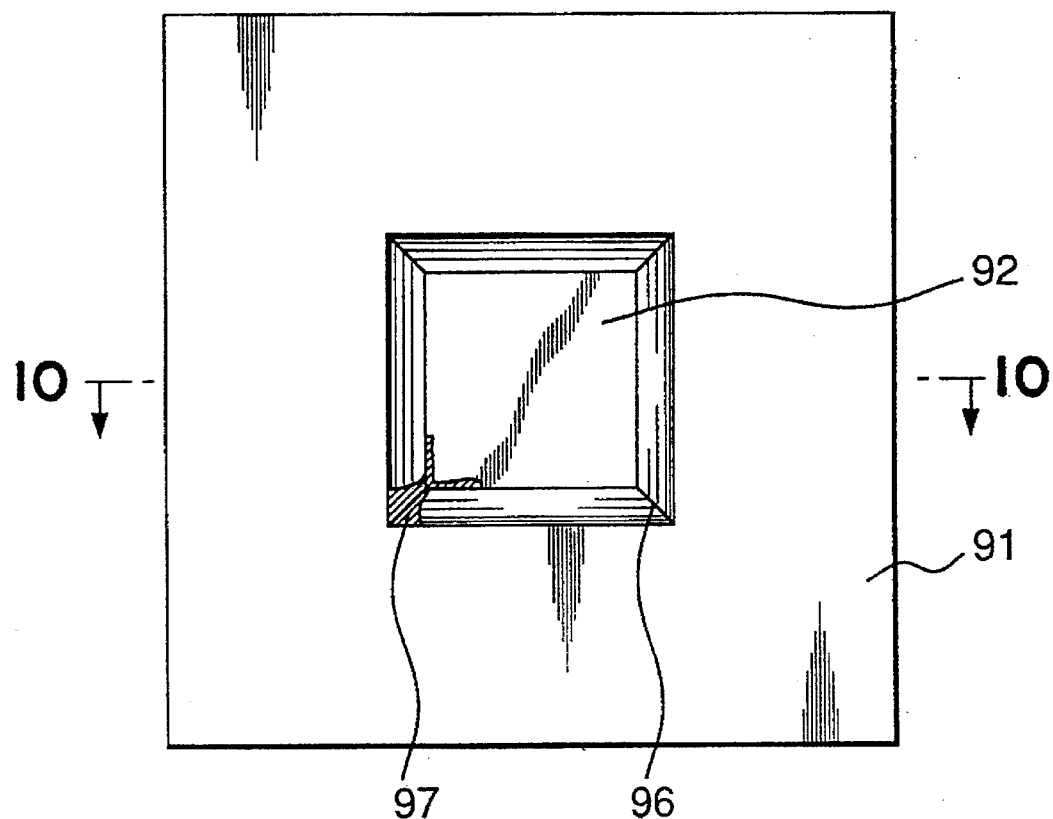
FIG. 9 shows the bottom of the pressure sensor chip used for the semiconductor pressure sensor of the prior art.
Figure 10:
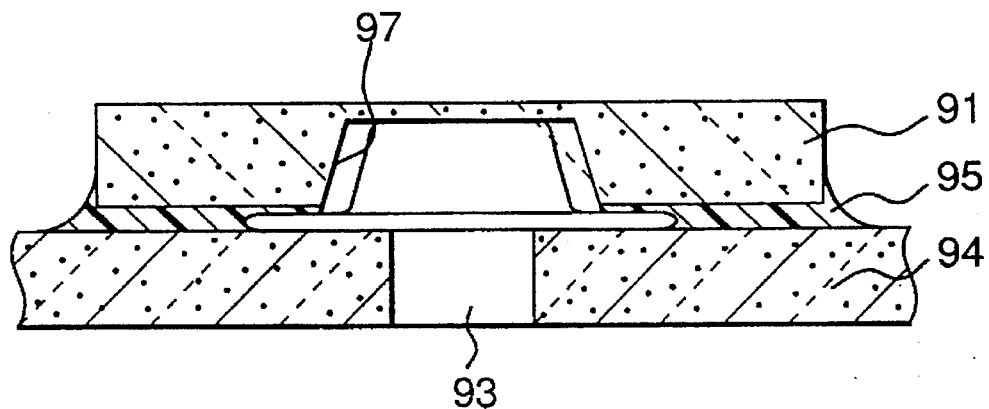
FIG. 10 shows the cross section 10—10 of the semiconductor pressure sensor shown in FIG. 9.

FIG. 8 shows Embodiment 7 of the semiconductor pressure sensor of the present invention. Prevention grooves 88 are formed as a square in each corner of pressure sensor chip 81 not in contact with the corners of diaphragm 82 and at some distance from them as shown in FIG. 8. This configuration more securely keeps the adhesive resin from flowing into the diaphragm than does Embodiment 4 mentioned above.

The prevention grooves formed around the diaphragm of the pressure sensor chip used in the semiconductor pressure sensor prevent any adhesive resin from being elevated on the diaphragm and improve the accuracy and the reliability of the pressure sensor.

The prevention grooves of the semiconductor pressure sensor of the present invention can be formed simultaneously with diaphragm 2 in the same anisotropic etching process. Therefore no additional process is required to make the grooves.

Since the prevention grooves of the semiconductor pressure sensor of the present invention are formed on the pressure sensor chip, there is no need for alignment with the die in the manufacturing process.

Although the present invention has been fully described in connection with the preferred embodiments thereof with reference to the accompanying drawings, it is to be noted that various changes and modifications; are apparent to those skilled in the art. Such changes and modifications are to be understood as included within the scope of the present invention as defined by the appended claims unless they depart therefrom.

What is claimed is:

1. A semiconductor pressure sensor comprising a pressure sensor chip including a diaphragm at the center thereof for measuring pressure and a die with an opening to transmit the pressure to said diaphragm, said pressure sensor chip having a surface surrounding said diaphragm and being pasted to said die with thermally setting adhesive resin, said surface of said pressure sensor chip having prevention grooves formed therein to prevent the adhesive resin from elevating onto said diaphragm, and wherein said pressure sensor chip has a generally rectangular shape with four corners, and said surface has two prevention grooves extending from each edge of said pressure sensor chip to form an L shape.

2. A semiconductor pressure sensor comprising a pressure sensor chip including a diaphragm at the center thereof for measuring pressure and a die with an opening to transmit the pressure to said diaphragm, said pressure sensor chip having a surface surrounding said diaphragm and being pasted to said die with thermally setting adhesive resin, said surface of said pressure sensor chip having prevention grooves formed therein to prevent the adhesive resin from elevating onto said diaphragm, and wherein said pressure sensor chip and said diaphragm have a generally rectangular shape, each prevention groove being parallel to a corresponding side of said diaphragm and extending from one edge of said pressure sensor chip to the opposite edge thereof.

3. A semiconductor pressure sensor comprising a pressure sensor chip including a diaphragm at the center thereof for measuring pressure and a die with an opening to transmit the pressure to said diaphragm, said pressure sensor chip having a surface surrounding said diaphragm and being pasted to said die with thermally setting adhesive resin, said surface of said pressure sensor chip having prevention grooves formed therein to prevent the adhesive resin from elevating onto said diaphragm, and wherein said pressure sensor chip has a generally rectangular shape with four corners, and said surface has two prevention grooves at each corner extending from adjacent edges forming said corner, said two prevention grooves at each corner intersecting with each other to form a cross.

4. A semiconductor pressure sensor comprising a pressure sensor chip including a diaphragm at the center thereof for measuring pressure and a die with an opening to transmit the pressure to said diaphragm, said pressure sensor chip having a surface surrounding said diaphragm and being pasted to said die with thermally setting adhesive resin, said surface of said pressure sensor chip having prevention grooves formed therein to prevent the adhesive resin from elevating onto said diaphragm, and wherein said pressure sensor chip and said diaphragm have a generally rectangular shape, and said surface has a square shaped prevention groove formed in each corner and in contact with a corresponding corner of said diaphragm.

5. A semiconductor pressure sensor comprising a pressure sensor chip including a diaphragm at the center thereof for measuring pressure and a die with an opening to transmit the pressure to said diaphragm, said pressure sensor chip having a surface surrounding said diaphragm and being pasted to said die with thermally setting adhesive resin, said surface of said pressure sensor chip having prevention grooves formed therein to prevent the adhesive resin from elevating onto said diaphragm, and wherein said pressure sensor chip and said diaphragm have a generally rectangular shape, and said surface has a cross shaped prevention groove formed in each corner of said pressure sensor chip near a corresponding corner of said diaphragm, each prevention groove not extending to an edge of said pressure sensor chip.

6. A semiconductor pressure sensor comprising a pressure sensor chip including a diaphragm at the center thereof for measuring pressure and a die with an opening to transmit the pressure to said diaphragm, said pressure sensor chip having a surface surrounding said diaphragm and being pasted to said die with thermally setting adhesive resin, said surface of said pressure sensor chip having prevention grooves formed therein to prevent the adhesive resin from elevating onto said diaphragm, and wherein said pressure sensor chip and said diaphragm have a generally rectangular shape, said surface has a square shaped prevention groove formed in each corner of said pressure sensor chip, and said square shaped prevention grooves are out of contact with a corresponding corner of said diaphragm.

7. A semiconductor pressure sensor, comprising:

a pressure sensor chip having a diaphragm at a center thereof, said diaphragm having a predetermined number of corner portions and having an upper and lower surface, said lower surface having grooves formed therein;

a die having an opening therein;

adhesive disposed in said said grooves to bond said lower surface of said pressure sensor chip to said die so that said diaphragm is disposed over said opening, and wherein said lower surface has grooves forming a cross shape near each corner portion of said diaphragm.

8. A semiconductor pressure sensor, comprising:

a pressure sensor chip having a diaphragm at a center thereof, said diaphragm having a predetermined number of corner portions and having an upper and lower surface, said lower surface having grooves formed therein;

a die having an opening therein;

adhesive disposed in said said grooves to bond said lower surface of said pressure sensor chip to said die so that said diaphragm is disposed over said opening, and wherein said lower surface has square shaped grooves forming a reservoir at each corner portion of said diaphragm.

9. The semiconductor pressure sensor of claim 8, wherein each of said square shaped grooves contact a corresponding corner portion of said diaphragm.

10. A semiconductor pressure sensor, comprising:

a pressure sensor chip having a diaphragm at a center thereof, said diaphragm having a predetermined number of corner portions and having an upper and lower surface, said lower surface having grooves formed therein;

a die having an opening therein;

adhesive disposed in said said grooves to bond said lower surface of said pressure sensor chip to said die so that said diaphragm is disposed over said opening, and wherein said lower surface has a groove parallel to each side of said diaphragm and adjacent grooves intersect to form a cross shape.

11. A semiconductor pressure sensor, comprising:

a pressure sensor chip having a diaphragm at a center thereof, and having an upper and lower surface, said lower surface having grooves formed therein;

a die having an opening therein;

adhesive disposed in said said grooves to bond said lower surface of said pressure sensor chip to said die so that said diaphragm is disposed over said opening, and wherein said lower surface has a groove extending from each adjacent side of each corner portion.

12. The semiconductor pressure sensor of claim 11, wherein said grooves extending from adjacent sides of each corner portion intersect to form a cross shape.

13. The semiconductor pressure sensor of claim 11, wherein said grooves extending from adjacent sides meet to form an L shape.

* * * * *